Sept. 26, 1967     D. R. PETRIK     3,343,495
RAILWAY SYSTEM WITH LOCOMOTIVE HAVING WHEEL
SUBSTITUTE SUPPORT MEANS
Filed Jan. 7, 1966     3 Sheets-Sheet 1
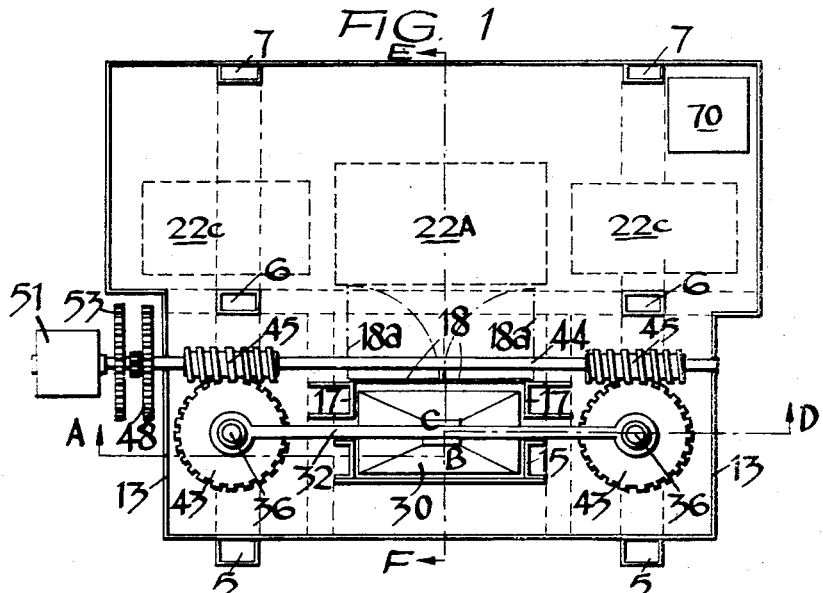
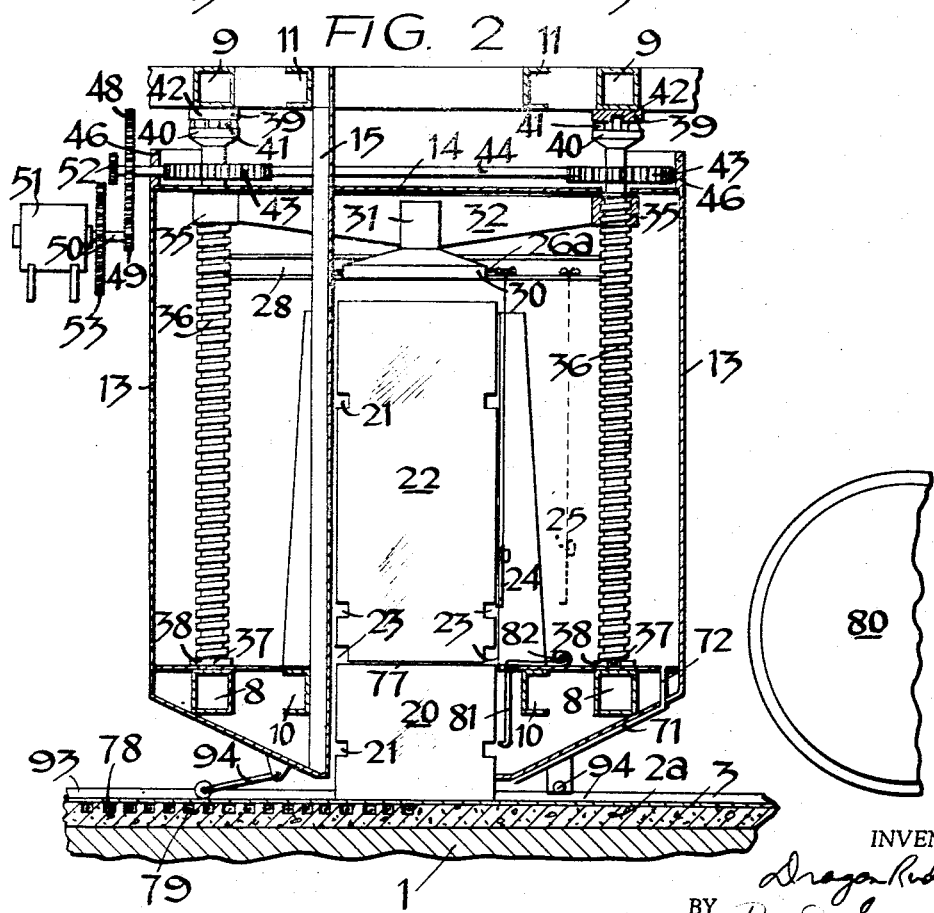
INVENTOR.
Dragan Rudolf Petrik
BY Dragan Rudolf Petrik
INVENTOR.

Sept. 26, 1967  D. R. PETRIK  3,343,495
RAILWAY SYSTEM WITH LOCOMOTIVE HAVING WHEEL
SUBSTITUTE SUPPORT MEANS
Filed Jan. 7, 1966  3 Sheets-Sheet 3
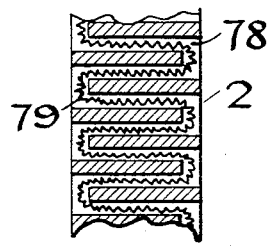
FIG. 5
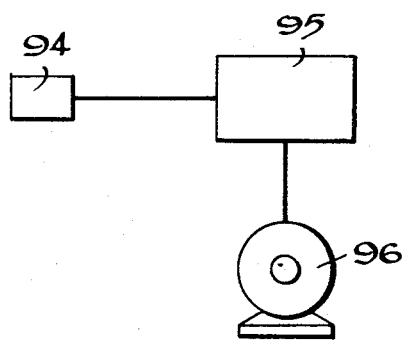
FIG. 6
FIG. 7
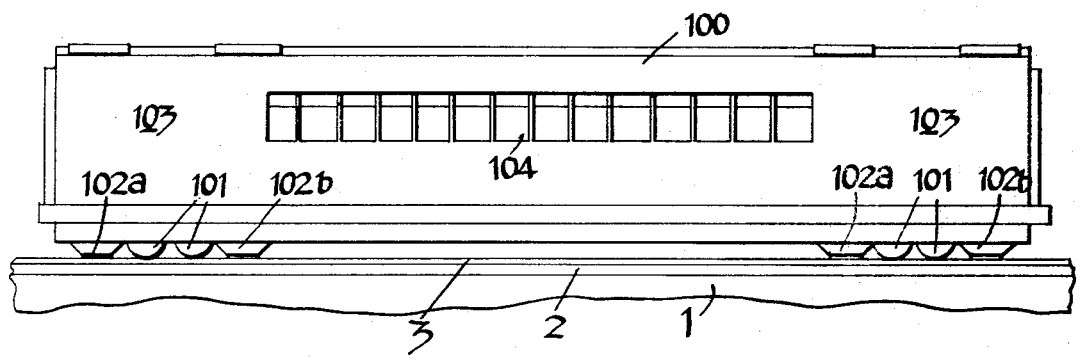
Dragan Rudolf Petrik
INVENTOR.
BY Peter J. Gaylor
ATTORNEY United States Patent Office 3,343,495
Patented Sept. 26, 1967

3,343,495
RAILWAY SYSTEM WITH LOCOMOTIVE HAVING WHEEL SUBSTITUTE SUPPORT MEANS
Dragan Rudolf Petrik, 274 Trouw St., Capital Park, Pretoria, Transvaal, Republic of South Africa
Filed Jan. 7, 1966, Ser. No. 519,344
Claims priority, application Republic of South Africa, Apr. 22, 1963, 1,697/63
7 Claims. (Cl. 104—1)

This is a continuation in part of my application, Ser. No. 302,776, filed Aug. 15, 1963, now abandoned, which by reference thereto forms part of the present disclosure.

This invention relates to improvements in or relating to means for landborne transport, i.e. transport carried on a solid support as distinct from waterborne or airborne transport.

The invention is applicable to all types of land vehicles such as cars, trucks, wagons and trains of vehicles.

It is an object of the invention to provide a substitute or alternative means of support for such vehicles, especially as an alternative to the usual wheeled means of support. Such object is especially operative to provide very high speeds of motion of the vehicles. A further object is to provide an alternative support so that rolling or wheeled support means may be at least partially eliminated, simplified or limited in its use both as regards duration and speed of use.

A further important object of the invention is to provide a low resistance to motion as compared with the rolling resistance pertaining to conventional wheeled vehicles.

The invention is especially applicable to vehicles powered by jet or rocket thrust, electric power, propellers or any other power, preferably such as is independent of wheels.

It is an object of the invention to provide a novel vehicle utilising the low coefficient of friction of ice in contact with a solid support, more particularly ice in contact with such support via a film of liquid water.

A further object is to provide such vehicle in combination with rails, tracks or other suitable solid supporting surface(s) on which said ice may slide. The essential characteristics of such surface or track are a smooth, regular and uninterrupted surface on which ice may slide. While it is not inconceivable that conventional rails as used for wheeled trains may be used, it is a particular object of the invention to provide tracks more advantageously adapted to the purpose, suitable to give support and directional guidance to the vehicle.

One of the objects in this connection is to provide a means of heating the track in cold climates ahead of the vehicle where necessary to maintain its efficiency.

It is a particular object of the invention to provide the ice blocks or skids as alternative support for wheels, which may be brought to support the vehicle instead of the wheels, by an action which in effect disengages the wheels from contact with the tracks.

A further object of the invention is to provide a duplicate set of ice block or skid supports on any one vehicle so that while one set is in use another may be replenished with new ice.

For example eight units may be used in a carriage having two pairs or sets of wheels, four arranged in two pairs ahead of the wheels and four in two pairs behind the wheels. In this arrangement one set of four units may be replenished while the other operates and vice versa.

It will be realised that while in use the ice will melt at the sliding surface, and it is a further object of the invention to provide compensating means whereby the ice block or skid is progressively pushed down as it melts to maintain the vehicle clear of the tracks.

Further objects of the invention are to provide a cabin or working room which is kept very cold, or deep freezed used as a store for reserve ice blocks, and means for transferring the ice and placing them in the guide ducts.

In a preferred embodiment of the invention a set of ice blocks or skids is provided immediately ahead of and behind each wheel pair or set of wheels.

Only half the ice blocks or skids are in operation at any one time. Changeover when one set becomes exhausted may be accomplished without stopping the train or engaging the wheels.

The invention and further objects will be described with reference to the accompanying drawings, but the invention is not limited solely to the embodiments illustrated.

The device illustrated in the accompanying drawings is adapted to be used on the carriages, "one wagon train" or trucks of a train, in which application eight skid units are mounted, two ahead and two behind each pair of wheels or wheel set. In this arrangement four may be in use at any time while the other four may be replenished. But the arrangement of the ice-block support can be other than described above, i.e. it can be adapted to any kind of vehicle, which runs on smooth (metal) tracks.

In the drawings:

FIG. 1 illustrates in plan view a device in accordance with a preferred embodiment of the invention.

FIG. 2 illustrates in sectional side elevation (on section ABCD, FIG. 1) the device illustrated in FIG. 1.

FIG. 5 illustrates in sectional plan view (on section lines G–H, FIG. 4) the heating element for the track in very cold regions.

FIG. 6 is a diagrammatic representation of a height control system.

FIG. 7 is a side elevation of a passenger carriage comprising a vehicle in accordance with the invention.

Figure 3:
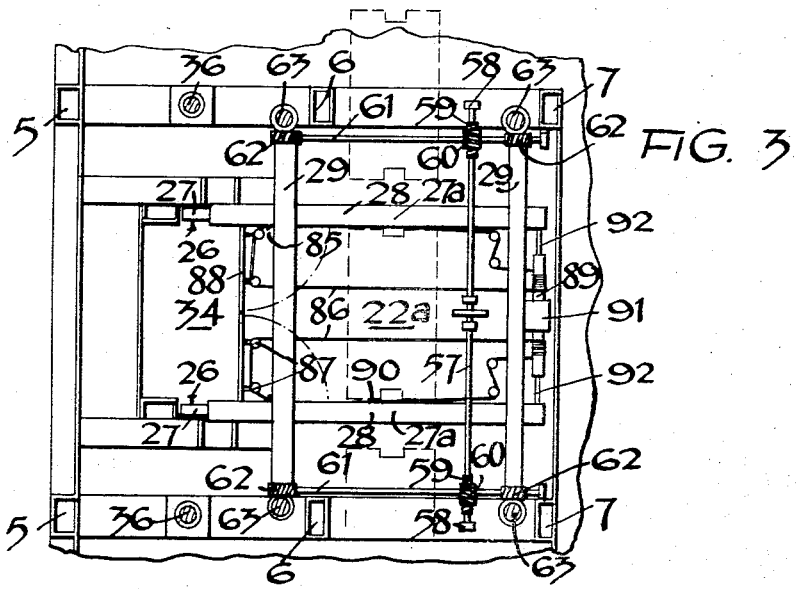
FIG. 3 illustrates in plan view the mechanism for handling the ice blocks in the device illustrated in FIG. 1.
Figure 4:
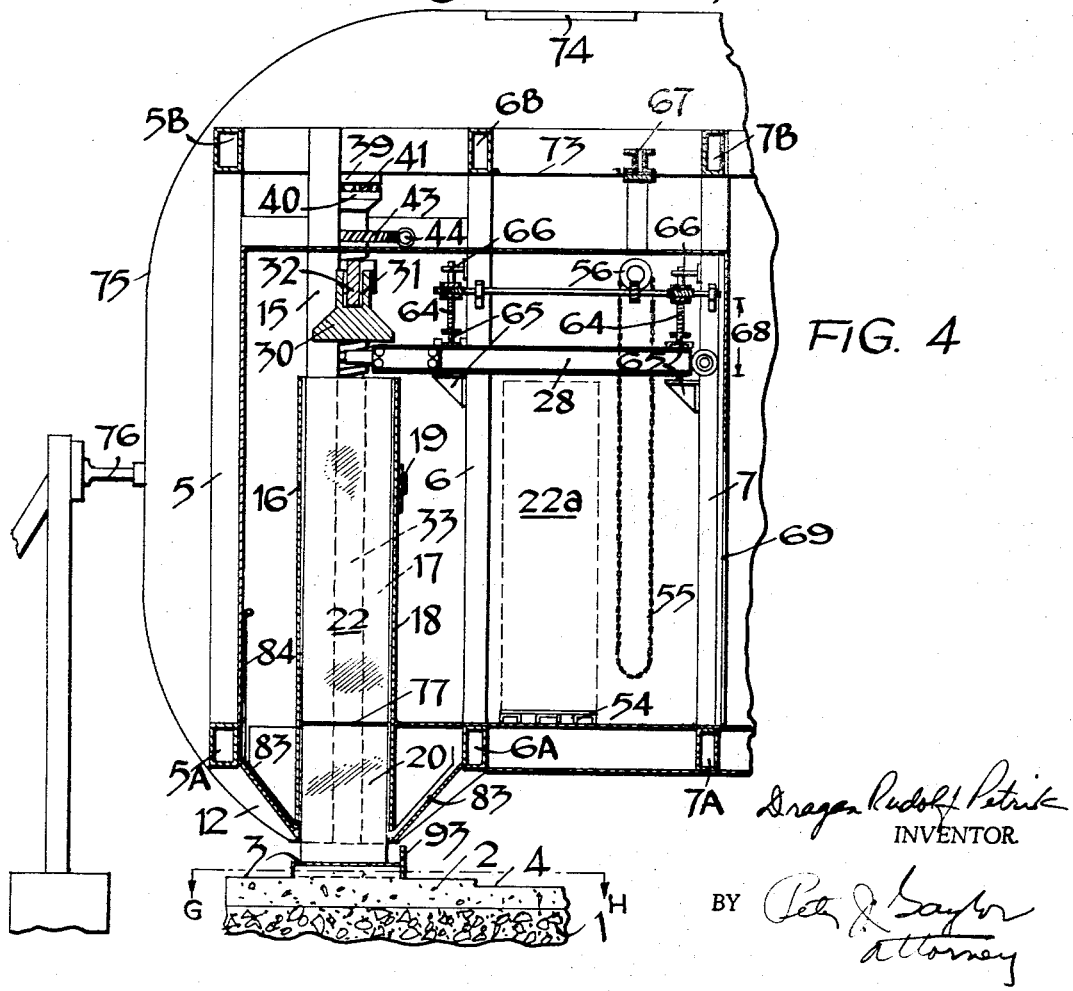
FIG. 4 illustrates in end sectional elevation (on section lines EF FIG. 1) the devices illustrated in FIG. 1.

Referring to the drawings the stone or ground layer beneath the track is indicated at 1. A concrete foundation 2 may be provided with ducts 78 for containing heating elements 79 especially in cold climates. In milder climates or if desired the ducts 78 may be omitted as shown at 2a. A smooth metal floor 3 is mounted on the concrete slab 2 (2a) and has an inner lateral flange 93 which would prevent the vehicle from leaving the tracks. A rubbing surface for frictional braking of the vehicle is provided at 4. By causing suitable friction pads (not shown) to bear against the surfaces 4 a powerful braking effect could be obtained.

The construction of the cabin and ice block guide-ducts and supports will be briefly described: upright beams 5, 6 and 7 connect lower horizontal beams 8 to upper horizontal beams 9, and transverse horizontal beams 5A, 6A and 7A further stiffen the frame at floor level and similarly the beams 5B, 6B and 7B.

Beams 10 and 11 support the guide duct structure with beams 15 connected thereto. An outside wall 12 is given good thermal insulating properties, as are the walls 13 and ceiling 14 of the cabin. The guide duct has a back wall 16, two side retaining strips 17 leaving a gap 33 between them and beams 15, and front doors 18 which open as indicated to 18A (FIG. 3). Levers 19 are provided to close the door.

A press slab 30 is used to press the ice block against the track 3, the top 31 of which is connected to the press beam 32. The press beam 32 is able to pass between the slots 33 in the guide duct. The press beam 32 has two screwed holes 35 in it, one at each end, through which pass spiral columns 36. The columns 36 are located at 37 at their lower ends in a slab 38, and at the top a slab 39 attached to beam 9 locates the upper end 42. A ball race 41 is located between slab 39 and an upper shoulder 40 of the column 36, providing thereby a thrust bearing. A wheel gear 43 is attached to the column 36. An axle 44 mounted in beams 46 has two worm gears 45 engaging the gears 43 of the two columns 36. A gear wheel 48 mounted on the shaft 44 meshes with a pinion 49 on shaft 50 of the electric motor 51 used for adjusting the position of the slab 30. For fast movement a pinion 52 on shaft 44 and gear 53 on shaft 50 of the electric motor 51 are engaged, disengaging the pinion 49 and gear 48.

Horizontal transportation of ice-blocks in the work-room to the guide-duct is executed by devices as shown in the accompanying drawings or by any known conventional devices.

The press-pad is also used for lifting the ice-blocks, e.g. when it is necesary to put the vehicle to its wheels, or to replenish the guide-duct with a new ice-block.

A partially exhausted ice-block 20 has been pushed down to the limit of travel of the press slab 30, and an ice block 22 has been placed on top of it. The block 20 will then be fully used up and the block 22 will then be used. Holes 21 in the ice blocks 22 and 20 are provided for putting the hooks 81 in to hold the block above the track 3. A new ice block 22A (FIG. 3) is positioned ready for loading, and reserve ice blocks are kept at 22c. Holes 23 are further provided, seen in the ice block 22 for the hooks 24 to be hooked therein.

The hooks 24 may be moved to the positions 25 if desired, and may be hooked onto bolts 26A if desired when the press slab 30 is to be used as a crane, e.g. for lifting out an ice block.

The hooks 24 are usually connected to bolts 26, located on sliding members 27, slidable along the length of the beams 28. The sliding members 27 are positioned at 27a to lift an ice block in the position 22a. The beams 28 are connected to beams 29, which in turn may be raised a height 68. This is done by pulling a chain 55 connected to wheel 56, mounted on axle 57. Axle 57 is mounted on the members 58 depending from beam 67 and has worm gears 59 coacting with gears 60 which in turn rotate axles 61. The axles 61 have two worm gears each 62 which mesh with gears 63 on helical threaded columns 64. Columns 64 bear on pedestals 65 and are retained at the top by bearings 66. The ice blocks are supported on platforms 54 having wheels or rollers for moving them, and may be lifted off by the above described gantrey and moved into the guide duct at the position 34 (FIG. 3), the sliding members 27 projecting from the ends of the beams 28.

The hooks 81 for holding the block up when not in use have handles 82 to slide them into or out of holes 23.

Grooves 83 are provided for a sliding screen 84 for closing off the bottom of the guide duct, providing thermal insulation.

Bolts 85 connect ropes 86 to the sliding members 27. Ropes 86 pass over pulleys 87, located on beam 88 which connects the beams 28, to a rotatable winding drum 89. The rope winds around drum 89 and its other end 90 is connected also via pulleys to the bolts 85 of sliding members 27. An electric motor 91 is used to operate the drum 89 so as to move the members 27 back and forth as desired for loading ice blocks. Axles 92 coupled to electric motor 91 may be used with a rope and hook connected to bolt 26 if required.

The cabin has a door 69, a freezing (cooling) machine 70, from which cold air is conducted via connection 72 and channel 71 to the open vertical part of the ice block 20. A further object of the refrigerating unit is to blow cold air to cool extended vertical surfaces of the ice block to prevent melting of ice blocks, which melting may be provoked by external hot air.

The means of transport of the invention is adapted for delivering required ice-blocks through the entrance for the ice-blocks which is placed in the ceiling and roof construction of the vehicle. Although the work-room and store for ice-blocks is provided with a freezing machine and the ice-blocks can be made in the work-room, it is preferred that the vehicle will be supplied with ice-blocks by a crane, in starting stations.

So stored ice-blocks in the work-room and ice-block duct are cooled by a freezing machine, and kept at a constant low temperature, at least −10° C. A door opening 73 is provided in the cabin ceiling for loading ice-blocks into the cabin, with a corresponding door 74 in the vehicle roof. The line of the outer body of the vehicle is indicated at 75.

A safety arm 76 is provided, adapted to bear against a supporting fence or side flange and retain the vehicle on the tracks 3.

It may be noted that the space 77 between two ice blocks 20 and 22 may freeze together, but in any case use of the block 20 will progress smoothly to use of block 22 without interruption of support of the vehicle.

The wheel 80 is located alongside the ice block 21. This is raised clear of its track when the ice block 21 runs on the track 3, having been pushed down to raise the carriage and its wheels a height $h$ above the ground.

The height $h$ of the lower edge of the guide duct above the track 3 when in use must be kept substantially constant, e.g. not to vary beyond limits of $h+\Delta h$ or $h-\Delta h$. To do this the ice block must be continuously moved down as it melts, and an automatic system controlling the motor 51 is necessary to achieve the above requirement.

As shown in FIG. 6 this system may comprise a height sensing unit 94, transmitting a signal which is a function of the height to a comparing unit 95. The unit 95 then initiates a control signal to the motor 96 which is a function of the comparison between a norm or control value and the signal received. The control signal operates the motor to provide a compensatory adjustment of the height. This is the usual feedback control system, and any suitable height sensing method may be used. For example mechanical, optical, magnetic or other sensing of the height may be adopted (see FIG. 2). But it is not the intention to specify or limit the invention to any particular control system.

The passenger carriage shown in FIG. 7 is one for use connected to a motive source e.g. a powered vehicle or connection in a train of such carriages and power vehicle(s).

The carriage 100 is provided with wheel sets 101 at each end. In front of each wheel set 101 are placed the ice skid means 102a and behind the ice skid means 102b. The refrigerated cabins are located in the regions 103, and windows 104 are provided at the passenger carrying region.

It will thus be seen that the ice skids 102 are alternative or substitute support means for the wheels 101. When the wheels 101 are brought out of contact with the rails (by raising them or lowering the ice blocks) the ice blocks contacts the track surface 3.

Generally only one set of ice skids, e.g. 102 will be used at any one time. During this period the ice blocks of the other set 102b may be replaced and readied for use. When the set 102a is expended the set 102b is lowered onto the track 3. The set 102a may then be raised out of contact with the track 3 and replaced.

Thus the train need not be stopped during the changeover, nor need the wheels 101 be used.

Use of the wheels 101 may be limited as desired or required, e.g. to stationary periods, at stations etc., to conserve the ice, or low speed travelling if desired or in accordance with any other circumstances as required.

Of course the wheels 101 could be eliminated altogether in suitable cases, although their retention may be persuaded by the desire to provide an emergency or reserve means of support.

What I claim is:

1. A vehicle adapted to travel by sliding on a solid smooth support and comprising holders for holding ice blocks with a downwardly directed side of said blocks exposed and bearing downwardly onto said smooth support in sliding contact therewith, said blocks carrying the weight of the vehicle, and means for advancing the blocks in a downward direction relative to the holder, adapted to compensate for the melting and wearing away of ice.

2. A vehicle as claimed in claim 1 comprising in each holder a pressure means for advancing the block of ice contained in the holder downwards, monitoring means for monitoring the distance by which each ice block projects from the holder and means responsive to said monitoring means and adapted to actuate said pressure means so as to maintain the said distance within a predetermined range.

3. A vehicle as claimed in claim 2 in which the responsive means comprise an electric motor which acts on spiral-threaded columns to move a pressure pad opposite the exposed side of the ice block.

4. A vehicle as claimed in claim 1 comprising each said holder in duplicate, refrigerated rooms adapted to contain replacement ice blocks, mechanisms for moving replacement ice blocks into said duplicate holders which are out of operation, whilst the other holder is in operation.

5. A vehicle as claimed in claim 4 comprising in addition wheels adapted to support the weight of the vehicle during periods whilst the blocks of ice are removed from contact with the supporting surface.

6. A vehicle system of the type described, comprising:
  (a) a smooth metal track designed to be traveled on by said vehicle,
  (b) heating means disposed at said track and designed to raise the temperature thereof, and
  (c) a support attached to the bottom of said vehicle, said support including holders for holding ice blocks with a downwardly directed side of said blocks exposed and bearing downwardly onto said smooth track in sliding contact therewith, said blocks carrying the weight of said vehicle.

7. A vehicle system according to claim 6, having lateral flanges adjacent said track and serving as guides for said ice blocks.

References Cited

UNITED STATES PATENTS

| | | | |
|---|---|---|---|
| 481,068 | 8/1892 | Simmons | 105—216 |
| 505,135 | 9/1893 | Smith et al. | 104—279 |
| 590,792 | 9/1897 | Pierpont | 238—122 X |
| 768,920 | 8/1904 | Voynow et al. | 238—122 XR |
| 1,012,900 | 12/1911 | Norwood | 238—122 X |
| 1,117,677 | 11/1914 | Kindahl | 180—6 |
| 1,238,431 | 8/1917 | Nylund | 104—136 |
| 1,356,794 | 10/1920 | Smith | 104—134 |
| 2,144,378 | 1/1939 | Kennedy | 148—150 |
| 2,864,318 | 12/1958 | Toulmin | 104—134 X |
| 2,942,557 | 6/1960 | Hirsch et al. | 104—134 |
| 3,115,074 | 12/1963 | Smith | 180—3 X |
| 3,130,840 | 4/1964 | Myer et al. | 212—14 |

FOREIGN PATENTS 146,867 12/1903 Germany.

ARTHUR L. LA POINT, *Primary Examiner.*

H. BELTRAN, *Assistant Examiner.*